United States Patent Office 3,565,820
Patented Feb. 23, 1971

3,565,820
REGENERATION OF CATALYSTS USED IN RESIDUAL OIL HYDROPROCESSING
William R. Coons, Jr., Port Arthur, and Gerald V. Nelson, Nederland, Tex., and Glenn C. Wray, Dyersburg, Tenn., assignors to Texaco Inc., New York, N.Y., a corporation of Delaware
No Drawing. Continuation-in-part of application Ser. No. 689,825, Dec. 12, 1967. This application June 19, 1969, Ser. No. 834,856
Int. Cl. B01j 11/04, 11/68
U.S. Cl. 252—414                8 Claims

ABSTRACT OF THE DISCLOSURE

Catalysts used in residual oil hydroprocessing have their activities restored by contacting with a distillate oil at about 600 to 800° F. and 0 to 3000 p.s.i.g. optionally in the presence of hydrogen; purging with hydrogen and then with nitrogen; steaming at about 400 to 800° F. and burning with an air steam mixture at a temperature below about 800° F.

---

This application is a continuation-in-part of our co-pending application Ser. No. 689,825 filed Dec. 12, 1967, now abandoned.

This invention relates to the regeneration of catalysts used to produce petroleum oil of reduced sulfur content from residuum-containing petroleum oils.

Processes for the production of such petroleum oils are described in our co-pending U.S. patent application Ser. No. 689,825 filed Dec. 12, 1967, and 787,908 filed Dec. 30, 1968. Briefly stated, the processes disclosed and claimed in said patent application comprise passing residual stocks over specific desulfurization catalysts at elevated temperature and pressure in a hydrogen atmosphere.

To compensate for catalyst deactivation during the on-stream period the normal procedure is to gradually increase the reactor temperature. As might be expected, such an increase in reactor temperature is accompanied by an increase in the rate of deposition of contaminants on the catalysts and, as a result, the deactivation rate of the catalyst becomes progressively greater. It therefore becomes necessary to shut down the production unit to regenerate or replace the catalyst when the reactor temperature has been increased to the maximum limit of reactor design or when conversion to light materials reaches an undesirable level. To minimize catalyst cost, the catalyst should be regenerated in situ and reused. Heretofore, however, it has been believed that conventional techniques alone were generally adequate for restoring the activity of desulfurization catalysts.

Departing from such conventional techniques we have discovered a new process of regenerating catalysts used in desulfurizing residuum containing fuel oils. According to our invention there is provided a process for regenerating the activity of catalysts used in residual oil hydroprocessing which comprises contacting the deactivated catalyst with a distallate oil boiling in the range of about 115° F. to 1100° F. and containing less than 1.0 wt. percent Conradson carbon residue under conditions tending to remove carbonaceous deposits and loosely associated contaminants from said bed; purging with hydrogen and then with nitrogen; steaming the catalyst to remove the distillate oil and deposits loosely associated with the catalyst and finally burning most of the catalyst contaminants by means of an air-stream burn at a temperature below about 800° F.

One of the main features of our process is that the heavy oils and asphaltic materials are removed from the catalyst by purging with hydrogen and then nitrogen prior to steaming and air-burning. Another main feature of our process is that the air burning is carried out at a temperature sufficient to remove most of the carbonaceous deposits without sintering contaminants metals on the catalysts and without causing excessive loss of catalytic surface area. Another feature of our process is the use of catalyst bed temperatures not exceeding 800 to 1000° F. In this process it has been found that maintaining catalyst beds temperatures as low as possible, but still high enough to sustain the desired combustion reactions, minimizes localized catalyst pellet temperatures.

The catalyst which may be regenerated by the process of our invention include a Group VIII metal compound such as the oxide or sulfide of cobalt, iron or nickel or mixtures thereof used in conjunction with Group VI metal compound such as the oxide or sulfide of molybdenum or tungsten. The Group VII metal compound may be present in an amount varying from about 1 to 20% by wt., preferably 2–10%, of the catalyst composite. The Group VI metal compound may be present in an amount ranging from about 5 to 40%, preferably 7–20%, of the total catalyst composite. The hydrogenating components are supported on a refractory inorganic oxide such as alumina, zirconia, magnesia or mixtures thereof associated with 2–30% of silica. The process of the invention is particularly applicable to catalysts comprising nickel and tungsten, cobalt and molybdenum or nickel and molybdenum on a refractory support. The catalyst advantageously has a surface area of 250 m.$^2$/g. to 400 m.$^2$/g. and a pore volume of 0.6 to 0.8 cc./g.

In the practice of the process of our invention, the residual feed stock flow to a reactor such as that shown in our co-pending application Ser. No. 787,908 filed Dec. 30, 1968 is stopped and a distillate oil feed is charged over the catalyst. Within the purview of the invention sought to be patented, this distillate oil suitably can include naphtha, kerosene, diesel fuels, light intermediate or heavy straight run or catalytic cycle gas oils. For ready identification, the distillate oil feed may be characterized as boiling in the range of 115° F. to 1100° F. and as containing less than 1.0 wt. percent Conradson carbon residue. Depending upon which mode of operation is more readily feasible under the particular operating conditions of a given production unit, the distillate oil can be passed over the catalyst bed alone, or, with hydrogen, at 0–3000 p.s.i.g., at a temperature up to 800° F., more specifically from about 600° F. to about 800° F., and 0.1 to 20.0 LHSV for periods of time sufficient to remove most of the residual oil and contaminant deposits loosely associated with the catalyst. Contact periods ranging from 1 to 24 hours are sufficient for washing the catalyst although longer periods may be used. Care should be exercised to avoid operating conditions which might result in the formation of additional carbonaceous deposits on the catalyst bed by "coking" or polymerization of the distillate oil.

The next step in the process consists in purging the catalyst with hydrogen, cooling it to around 500° F., depressurizing and then purging with nitrogen. The hydrogen purge serves to remove the distillate oil and other substances which might be combustible in the burning step and the nitrogen purge removes hydrogen.

The catalyst is steamed to remove the distillate oil and any additional deposits which are originally loosely associated with the catalyst or that were converted from a strongly associated form to a loosely associated form by the action of the distillate charge used to wash the catalyst. These deposits include coke, polymeric materials, asphaltic materials or asphaltenes dissolves in the distillate oil or attrited from the catalyst by physical agitation of the distillate oil. As will be shown below, it is desirable to remove as much of the oil and deposits as possible before the catalyst is subjected to an air burn. Preferred steaming conditions for the process of the invention are temperatures of about 400–800° F., pressures of about 0–200 p.s.i.g. and 0.01–20.0 lbs. of steam per hour per lb. of catalyst. Periods ranging from about 1 to 48 hours are preferred but longer periods may be used if desired. During the steaming procedure, it is possible to recover in known manner the metal contaminants; in particular, the heavy metals.

After the catalyst is steamed, an air burn is conducted to remove most of the catalyst contaminants as gaseous combustion products. For this operation, it is preferred to use a mixture of steam and air to form the combustion products. The original air burn should be initiated at 600° F. at the inlet bed, with a maximum burn front of 800° F. and preferably below 750° F. It is possible to control the burn front by adjusting the inlet temperature and the concentration of oxygen in the steam-air mixture. The inlet temperature should be maintained above about 400° F. and preferably above about 500° F. while the burn is in progress. During initial burn off, the oxygen concentration at the reactor inlet should be maintained below 1.0 mole percent, preferably below 0.5 mole percent. After the burn front has traveled through the bed, the catalyst bed inlet temperature is then raised to 700° F. and the burn front is again allowed to travel through the bed, keeping the maximum temperature below about 800° F. and preferably below about 750° F.

The following examples serve to illustrate but do not limit the invention.

EXAMPLE 1

An aromatic concentrate stream (charge stock No. 2 in Table I) was charged over a cobalt-molybdenum on alumina hydro-treating catalyst (Catalyst 1 in Table II) at the conditions shown in Table III, for Run 1. After the first run, the catalyst was regenerated using a nitrogen-air mixture. The reactor lead bath was held at 900° F. while the maximum burn front reached 980° F. in the catalyst bed during regeneration. The charge stock was then processed at the same conditions given for Run 1. The hydroprocessing-catalyst regeneration cycle was repeated three times. Then the cycle was repeated seven additional times, using a steam-air mixture during the regeneration procedure. The steam rate was 1.8–4.9 WHSV (weight of charge per hour per weight of catalyst) and the air to steam weight ratio was 0.02–0.14. During the subsequent regenerations, the maxium catalyst bed temperature reached 1068° F. while maintaining the reactor bath temperature at 900° F. The carbon content of the spent catalyst varied between 8.34 and 35.83 before each regeneration. After the eleventh regeneration cycle, Run 2 was conducted. As can be seen, the catalyst activity was essentially equivalent on the two runs, as measured by the liquid product gravity and sulfur content. Thus, the use of nitrogen-air steam-air mixtures at temperatures of 900° F. to 1068° F. was very effective for regenerating the catalyst used to hydroprocess the distillate stock. After regenerating the catalyst after Run 2, the surface area of the catalyst was 156 m.²/g., or 76.4% of the fresh catalyst surface area of 204 m.²/g.

It appears from the foregoing example that regeneration procedures conducted at 900–1000° F. are effective in restoring the activities of catalysts used in distillate oil hydroprocessing.

EXAMPLE II

The following example illustrates the undesirable effects of regenerating a catalyst used to hydroprocess a residual stock, using a steam-air mixture at temperatures of 900° F. and above.

An atmospheric reduced crude (Charge Stock No. 3 in Table I) was charged over a nickel-molybdenum on alumina-silica catalyst (Catalyst 2 in Table II) at the conditions shown in Table IV for Run 3. After operating on the catalyst for a total run length of 1715 hours, the catalyst was then regenerated using the following procedure:

(1) A gas oil (Charge Stock 1 in Table I) was charged over the used catalyst for 14 hours at the following conditions: 700° F., 0.67 LHSV, 1750 p.s.i.g., and 7,770 s.c.f./bbl. charge (85.4 vol. percent H₂).

(2) The reactor was then purged with hydrogen to remove the gas oil, depressured, and purged with nitrogen. The catalyst was then regenerated at 900° F., 1.65 WHSV steam rate, and an air to steam weight ratio of 0.28. The maximum catalyst bed temperature reached 995° F., while regenerating for 20 hours.

(3) After regeneration, the catalyst was unloaded, weighed and tested. The regenerated catalyst weight was 112.0 weight percent of the fresh catalyst loading. The amount of contaminant metals (nickel, vanadium, iron, etc.) deposited on the catalyst was 5.5 weight percent of the fresh catalyst loading and the amount of sulfur deposited was 6.5 weight percent. The surface area of the regenerated catalyst (185 m.²/g.) was 53 percent of the fresh catalyst surface area (349 m.²/g.).

After regenerating the catalyst, Runs 4 and 5 were conducted. After 114 hours of operation on the regenerated catalyst, the sulfur content of the liquid product was 1.28 times the sulfur content obtained on the unregenerated catalyst at an age of 458 hours. After 434 hours of operation on the regenerated catalyst, the sulfur content of the liquid product was 2.77 times that obtained on the unregenerated catalyst after a similar length of run. Thus, the regeneration procedure conducted at temperatures of 900° F. and above proved to be ineffective for regaining and maintaining the activity of the fresh catalyst.

EXAMPLE III

The following example is similar to Example II, where regeneration temperatures above 900° F. were shown to be undesirable for regenerating a catalyst used to hydroprocess a residual stock.

An atmospheric reduced crude (Charge Stock No. 4 in Table I) was charged over a cobalt-molybdenum on alumina-silica catalyst (Catalyst 3 in Table II) at the conditions given below in Table V for Run 6. The catalyst had been in operation for a period of 3307 hours. The unit was then operated for an additional 388 hours, wherein the liquid product sulfur content increased from 1.0 to 1.1 weight percent. After operating the unit to a catalyst age of 4924 hours, the catalyst was then regenerated, using the following procedure:

(1) The unit was purged with hydrogen, depressured, and then purged with nitrogen. The catalyst was then regenerated for 29 hours at a reactor bath temperature of 815° F. During this period the maximum catalyst bed temperature reached 990° F., while using an oxygen-nitrogen mixture containing less than 5 volume percent oxygen.

(2) The reactor bath was then increased to 900° F., and the catalyst was regenerated for an additional eight hours, wherein the maximum catalyst bed temperature reached 915° F.

Following the regeneration, Run 8 was conducted, as shown in Table V. The liquid product sulfur content was 0.72 times as much as that obtained for Run 6 on the unregenerated catalyst. However, after running to a catalyst age of 522 hours on the regenerated catalyst, the sulfur content of the liquid product was the same as that obtained for Run 7. Thus, for comparable running times on the unregenerated and regenerated catalyst, the regenerated catalyst aged much faster and eventually came back to the same activity level as was observed before regeneration. Although the regeneration technique improved the activity of the aged catalyst, it failed to provide the improved activity for an extended period of time greater than 522 hours, as seen from Run 9.

TABLE I.—CHARGE STOCK TEST RESULTS
Charge stock Number Description

|  | 1 | 2 | 3 | 4 | 5 |
| --- | --- | --- | --- | --- | --- |
|  | Cycle gas oil | Furfural extract | Atm. reduced Arabian crude | Atm. reduced Lago Medio crude | Atm. reduced Lago Medio crude |
| Gravity, ° API at 60° F | 28.3 | 11.8 | 21.5 | 20.2 | 21.0 |
| X-Ray sulfur, wt. percent | 0.18 | 1.7 | 2.6 | 1.85 | 1.74 |
| Conradson carbon residue, wt. percent | 0.05 | 0.11 | 7.1 | 7.8 | 7.2 |
| Normal pentane insolubles, wt. percent [1] | 0.003 |  | 3.5 | 4.7 | 4.5 |
| Kinematic viscosity, CS: |  |  |  |  |  |
| At 100° F | 5.94 | 2.29 | 73.20 | 269.59 | 192.22 |
| At 210° F | 1.83 | 0.93 | 8.93 | 18.12 | 15.50 |
| Boiling range, ° F.: |  |  |  |  |  |
| IBP | 392 | 471 | 363 | 453 | 477 |
| 10 vol. percent OH | 508 | 481 | 526 | 632 | 586 |
| 50 vol. percent OH | 626 | 490 | 794 | 888 | 877 |
| 90 vol. percent OH | 718 | 507 |  |  |  |
| EP | 760+ | 535 |  |  |  |
| X-Ray metals, p.p.m.: |  |  |  |  |  |
| Ni |  | 0.1 | 9.1 | 19.0 | 19.0 |
| V |  | 0.1 | 19.0 | 188.0 | 188.0 |
| Fe |  | 0.1 | 4.3 | 2.0 | 1.0 |

[1] The normal pentane insoluble content of a stock is a measure of the asphaltene content.

TABLE II.—FRESH CATALYST TEST RESULTS

|  | Number | | |
| --- | --- | --- | --- |
|  | 1 | 2 | 3 |
| Type | Co-Mo on alumina | Ni-Mo on silica-alumina | Co-Mo on silica-alumina |
| Extrudate size, in | 1/8 | 1/8 | 1/16 |
| Surface area, m.²/gm | 204 | 349 | 312 |
| Pore volume, cc./gm |  | 0.72 | 0.66 |
| Crushing strength, lbs | 15.4 | 7.8 | 12.8 |
| Bulk density, lb./ft.³ | 41.1 | 33.0 | 43.0 |
| Leco carbon, wt. percent | 0.03 | 0.26 | 0.45 |
| Leco sulfur, wt. percent | 0.31 | 0.39 | 0.95 |
| Composition, wt. percent: |  |  |  |
| Ni [1] |  | 2.8 |  |
| Co [1] | 2.9 |  | 2.1 |
| Mo [1] | 7.9 | 9.9 | 11.0 |
| Silica, wt. percent |  | 14.0 | 3.9 |
| Alumina, wt. percent | (²) | (²) | (²) |

[1] Present in oxide form.
[2] Remainder.

TABLE III.—STEAM-AIR OR NITROGEN-AIR REGENERATION OF CATALYST USED IN HYDROPROCESSING DISTILLATE

|  | Run | |
| --- | --- | --- |
|  | 1 | 2 |
| Reactor Temperature, ° F | 805 | 809 |
| LHSV, vo./hr./vc | 0.99 | 0.99 |
| Reactor pressure, p.s.i.g | 500 | 500 |
| Reactor feed gas: |  |  |
| Rate, s.c.f./bbl. charge | 3196 | 3102 |
| Vol. percent H₂ | 95.4 | 93.0 |
| Liquid product: |  |  |
| Gravity, ° API at 60° F | 16.3 | 16.2 |
| Sulfur, wt. percent | 0.005 | 0.006 |
| Charge: |  |  |
| Gravity, ° API at 60° F | 11.8 | 11.8 |
| Sulfur, wt. percent | 1.7 | 1.7 |
| Hours on catalyst, total | 54 | 654 |
| Hours after start-up or regeneration | 54 | 60 |
| Number of regenerations | 0 | 11 |

TABLE IV.—GAS OIL WASH AND STEAM-AIR REGENERATION OF CATALYST USED IN HYDROPROCESSING AN ATMOSPHERIC REDUCED CRUDE

|  | Run | | |
| --- | --- | --- | --- |
|  | 3 | 4 | 5 |
| Reactor temperature, ° F | 774 | 777 | 777 |
| LHSV, vo./hr./vc | 0.47 | 0.048 | 0.49 |
| Reactor pressure, p.s.i.g | 1,750 | 1,750 | 1,750 |
| Reactor Feed Gas: |  |  |  |
| Rate, s.c.f./bbl. charge | 10,146 | 9,370 | 7,850 |
| Vol. Percent H₂ | 86.8 | 85.4 | 85.9 |
| Liquid Product: |  |  |  |
| Gravity, °API at 60° F | 28.8 | 28.3 | 26.4 |
| Sulfur, wt. percent | 0.35 | 0.45 | 0.97 |
| Charge: |  |  |  |
| Gravity, °API at 60° F | 21.5 | 21.5 | 21.5 |
| Sulfur, wt. percent | 2.6 | 2.6 | 2.6 |
| Hours on catalyst, total | 458 | 1,829 | 2,149 |
| Hours after start-up or regeneration | 458 | 114 | 434 |
| Number of regenerations | 0 | 1 | 1 |

TABLE V.—HYDROGEN AND NITROGEN PURGE FOLLOWED BY REGENERATIONS AT 815° F.[1] AND 900° F.[1] OF CATALYST USED IN HYDROPROCESSING ATMOSPHERIC REDUCED CRUDE

|  | Run | | | |
| --- | --- | --- | --- | --- |
|  | 6 | 7 | 8 | 9 |
| Reactor temperature, ° F | 752 | 754 | 754 | 755 |
| LHSV, vo./hr./vc | 0.48 | 0.46 | 0.43 | 0.49 |
| Reactor pressure, p.s.i.g | 1,750 | 1,750 | 1,750 | 1,750 |
| Reactor feed gas: |  |  |  |  |
| Rate, s.c.f./bbl. charge | 12,050 | 11,650 | 12,180 | 12,230 |
| Vol. percent H₂ | 81.3 | 81.5 | 86.2 | 84.0 |
| Liquid product: |  |  |  |  |
| Gravity, ° API at 60° F | 23.4 | 23.3 | 2.54 | 23.5 |
| Sulfur, wt. percent | 1.00 | 1.10 | 0.72 | 1.10 |
| Charge: |  |  |  |  |
| Gravity, °API at 60° F | 20.2 | 20.2 | 20.2 | 20.2 |
| Sulfur, wt. percent | 1.85 | 1.85 | 1.85 | 1.85 |
| Hours on catalyst, total | 3,307 | 3,695 | 5,036 | 5,446 |
| Hours after start-up or regeneration | 3,307 | 3,695 | 112 | 522 |
| Number of regenerations | 0 | 0 | 1 | 1 |

[1] Reactor bath temperature.

EXAMPLE IV

The following example illustrates the desirable effects of utilizing the novel regeneration procedure discussed previously for restoring the activity of a catalyst used to hydroprocess a residual stock.

An atmospheric reduced crude (Charge Stock No. 4 in Table I) was charged over a cobalt-molybdenum on alumina-silica catalyst (Catalyst 3 in Table II) at the conditions given for Run 10 in Table IV. As shown, the catalyst exhibited good desulfurization and hydrocracking activities (as measured by API gravity) at a catalyst age of 84 hours. The run was continued to a total catalyst age of 314 hours, at which time Run 11 was conducted. As shown, the desulfurization and hydrocracking activities of the catalyst had become substantially reduced while charging the residual stock.

After running the unit to a catalyst age of 1654 hours, the catalyst was regenerated using the following procedure:

(1) The catalyst was washed with a gas oil (Charge Stock I in Table I) for 25 hours at 700° F., 0.5 LHSV, 1750 p.s.i.g., and 7300 s.c.f. reactor feed gas/bbl. charge (86.2% H₂).

(2) The reactor was then purged with hydrogen, depressured, and purged with nitrogen. The catalyst was then unloaded. The amount of sulfur, carbon, and contaminant metals deposited on the catalyst was 49.6 weight percent of the original reduced catalyst weight. Of the 49.6 percent increase in weight, carbon was 24.4 percent, sulfur was 14.8 percent, and contaminant metals (Ni, V, Fe, Cr, etc.) were 10.6 percent. The amount of contaminant metals remaining on the catalyst was 100 percent of those removed from the charge stock and deposited on the catalyst. The used catalyst (without further treatment) had a surface area of 46 m.²/g. The used catalyst had a surface area of 85 m.²/g., after calcining a sample of it for 2 hours in a muffle furnace at 1000° F. to remove the carbonaceous deposits.

(3) After sampling, the used catalyst was reloaded to the reactor and was regenerated as follows:

(a) With the reactor bath temperature at 600° F., the catalyst was steamed for 34 hours at an average steam to catalyst ratio (WHSV) of 0.49.

(b) The catalyst was then regenerated at a 625° F. reactor bath temperature for a period of 52 hours at an average steam rate of 0.09 WHSV and an average air to steam weight ratio of 0.42. During the regeneration, the maximum temperature in the catalyst bed reached 755° F. The air to steam weight ratio was then raised to 2.93 for a period of 4 additional hours, where the maximum catalyst bed temperature reached 640° F.

(c) The catalyst was further regenerated at a reactor bath temperature of 700° F. for a period of nine hours, wherein the maximum catalyst bed temperature reached 720° F.

(4) After regeneration, the catalyst was unloaded, weighed and sampled. The regenerated catalyst weight gain was only 12.1 percent of the original reduced catalyst weight, compared to 49.6 percent for the unregenerated catalyst weight gain. Of the 12.1 percent additional weight, 2.7 percent was sulfur, 0.3 percent was carbon, and 9.1 percent was contaminant metals. The gas oil wash and the regeneration procedure removed 14 percent of the metals deposited on the catalyst. The regenerated catalyst surface area was 126 m.²/g., or 40.4 percent of the fresh catalyst surface area of 312 m.²/g. As discussed in section (2) above, the used catalyst regenerated at 1000° F. had a surface area of only 27.2 percent of the fresh catalyst.

After the catalyst was regenerated, Runs 12 and 13 were conducted, as shown in Table VI.

TABLE VI.—GAS OIL WASH, HYDROGEN AND NITROGEN PURGE, STEAM STRIP, FOLLOWED BY STEAM-AIR REGENERATION AT 625° F.¹ AND 700° F.¹ OF CATALYST USED HYDROPROCESSING ATMOSPHERIC REDUCED CRUDE

| | Run | | | |
|---|---|---|---|---|
| | 10 | 11 | 12 | 13 |
| Reactor temperature, °F | 782 | 780 | 781 | 778 |
| LHSV, vo./hr./vc | 0.49 | 0.51 | 0.51 | 0.48 |
| Reactor pressure, p.s.i.g | 1,750 | 1,750 | 1,750 | 1,750 |
| Reactor feed gas: | | | | |
| Rate, s.c.f./bbl. Charge | 6,700 | 6,740 | 6,010 | 7,050 |
| Vol. percent H₂ | 78.9 | 79.6 | 86.2 | 84.8 |
| Liquid Product: | | | | |
| Gravity, ° API at 60° F | 27.6 | 26.2 | 27.9 | 26.0 |
| Sulfur, wt. percent | 0.25 | 0.52 | 0.27 | 0.56 |
| Charge: | | | | |
| Gravity, ° API at 60° F | 20.2 | 20.2 | 20.2 | 20.2 |
| Sulfur, wt. percent | 1.85 | 1.85 | 1.85 | 1.85 |
| Hours on catalyst, total | 84 | 314 | 1,740 | 1,978 |
| Hours after start-up or regeneration | 84 | 314 | 86 | 324 |
| Number of regenerations | 0 | 0 | 1 | 1 |

NOTE.—The above data show that on the basis of product gravity and sulfur contents, the regenerated catalyst had an activity almost equal to that of the fresh catalyst for an equal run length.
¹ Reactor bath temperature.

EXAMPLE V

The following example illustrates the separate and combined effects of (1) distillate oil wash, (2) steaming, and (3) regeneration with steam-air mixture at temperatures below 800° F.

An atmospheric reduced crude (Charge Stock No. 4 in Table I) was charged over a cobalt-molybdenum on alumina-silica catalyst (Catalyst 3 in Table II) at the conditions given for Run 14 in Table VII. As shown, the catalyst exhibited good desulfurization activity at a catalyst age of 52 hours. After running to a catalyst age of 172 hours, the desulfurization activity of the catalyst had declined, as shown for Run 15. The run was continued to a catalyst age of 2035 hours, while running at 700° F. and 725° F. As shown for Run 16, the desulfurization activity of the catalyst had become substantially reduced.

The catalyst was then treated as follows: A gas oil (Charge Stock 1 in Table I) was charged over the used catalyst at 0.56 LHSV, 1750 p.s.i.g., 727° F., and 4500 s.c.f. reactor feed gas/bbl. charge (92.6 vol. percent H₂) for a 24 hour period. Then Run 17 was conducted on the washed catalyst. As shown, the gas oil wash had a marginal effect on improving the activity of the catalyst.

The run was continued at reactor temperatures from 725° F. to 765° F. to a catalyst age of 3189 hours, at which time Run 18 was conducted. As seen, the catalyst's desulfurization activity had become substantially reduced (compared to Run 14). The catalyst was then treated as follows:

(a) A gas oil (Charge Stock 1 in Table I) was charged over the catalyst at 0.66 LHSV, 700° F., 1750 p.s.i.g., and 3700 s.c.f. reactor feed gas/bbl. charge (85.1 vol. percent H₂) for a 12 hour period. The catalyst was then purged with hydrogen, cooled to 500° F., and then purged with nitrogen after depressuring the reactor.

(b) The catalyst was then steamed for 36 hours at 500° F. and a steam rate of 0.71 WHSV. The temperature was increased to 700° F. and the catalyst was further steamed for 6 hours at a steam rate of 1.60 WHSV.

Following the steaming step, Run 19 was conducted. As seen, the steaming step was marginally successful for improving the activity of the catalyst.

The run was continued to a catalyst age of 3457 hours at which time Run 20 was conducted on a different batch of the atmospheric reduced crude charge stock (Charge Stock 5 in Table I). As seen, the desulfurization activity of the catalyst was about the same as on the two batches of charge stocks. The catalyst was then treated as follows:

(a) A gas oil (Charge Stock 1 in Table I) was charged over the catalyst at 0.51 LHSV, 704° F., 1750 p.s.i.g., 4,060 s.c.f. reactor feed gas/bbl. charge, 79.3 vol. percent H₂) for a 24 hour period. The catalyst was then purged with hydrogen, cooled, purged with nitrogen and unloaded. The catalyst weight gain was equal to 64.6 percent of the fresh, reduced catalyst weight originally loaded to the reactor. Of the 64.6 percent increase, 30.4 percent was carbon, 14.6 percent was sulfur, and the remaining 19.6 percent was contaminant metals.

(b) The catalyst was reloaded to the reactor and was steamed for 131 hours at 600° F. and a 2.33 WHSV steam rate.

Run 21 was conducted 72 hours after steaming the catalyst. The steaming step was marginally successful in improving the activity of catalyst. The run was continued to a catalyst age of 3747 hours. The catalyst was then regenerated as follows:

(a) A gas oil (Charge Stock 1 in Table I) was charged over the catalyst for 12 hours at 0.51 LHSV, 700° F., 1750 p.s.i.g., and 5,400 s.c.f. reactor feed gas/bbl. charge (82.7 vol. percent H₂). The unit was then purged with hydrogen, depressured, and purged with nitrogen. The catalyst was steamed for three hours (2.4 WHSV) and was then regenerated for 12 hours at 600° F. reactor block temperature, at an average steam rate of 1.4 WHSV and an average air to steam weight ratio of 0.66. During this regeneration period, the maximum temperature in the catalyst bed reached 655° F. The catalyst was further regenerated for 10 additional hours with the air to steam ratio increased to 1.30 and the steam rate increased to 1.57 WHSV. The maximum catalyst bed temperature during this period was 610° F. The catalyst was then regenerated for 46 additional hours at a reactor temperature of 695° F. at a stem rate of 1.43 WHSV and an average air to steam weight ratio of 0.42. The maximum catalyst bed temperature reached 720° F.

Following the regeneration, Run 22 was conducted. It will be seen that the regeneration restored the activity of the catalyst to near that of the fresh catalyst (Run 14) or about 93% of the desulfurization obtained on the fresh catalyst. The run was continued and Run 23 was made.

TABLE VII.—DATA SHOWING EFFECTS OF GAS OIL WASH, STRIPPING AND STEAMING SEPARATELY AHEAD OF REGENERATION

| | Run | | | | | | | | | |
|---|---|---|---|---|---|---|---|---|---|---|
| | 14 | 15 | 16 | 17 | 18 | 19 | 20 | 21 | 22 | 23 |
| Reactor temperature, °F | 704 | 702 | 727 | 725 | 703 | 700 | 703 | 700 | 703 | 699 |
| LHSV, vo./hr./vc | 0.51 | 0.50 | 0.51 | 0.49 | 0.50 | 0.46 | 0.48 | 0.46 | 0.52 | 0.50 |
| Reactor pressure, p.s.i.g | 1,750 | 1,750 | 1,750 | 1,750 | 1,750 | 1,750 | 1,750 | 1,750 | 1,750 | 1,750 |
| Reactor feed gas: | | | | | | | | | | |
| Rate, s.c.f./bbl. charge | 6,220 | 5,290 | 5,190 | 5,200 | 4,920 | 5,810 | 4,460 | 6,640 | 5,000 | 5,330 |
| Vol. percent $H_2$ | 83.6 | 86.1 | 92.6 | 91.7 | 85.3 | 84.8 | 79.3 | 82.7 | 82.0 | 81.0 |
| Liquid product: | | | | | | | | | | |
| Gravity, °API at 60°F | 23.9 | 23.5 | 22.6 | 22.8 | 21.2 | 21.7 | 22.5 | 22.5 | 24.1 | 23.8 |
| Sulfur, wt. percent | 0.58 | 0.73 | 1.02 | 0.91 | 1.48 | 1.35 | 1.37 | 1.22 | 0.63 | 0.77 |
| Charge: | | | | | | | | | | |
| Gravity, °API at 60°F | 20.2 | 20.2 | 20.2 | 20.2 | 20.2 | 20.2 | 21.0 | 21.0 | 21.0 | 21.0 |
| Sulfur, wt. percent | 1.85 | 1.85 | 1.85 | 1.85 | 1.85 | 1.85 | 1.74 | 1.74 | 1.74 | 1.74 |
| Hours on catalyst, total | 52 | 172 | 2,035 | 2,107 | 3,189 | 3,259 | 3,457 | 3,553 | 3,791 | 3,937 |
| Hours after start-up, gas oil wash, steaming, or regeneration | 52 | 172 | 2,035 | 72 | 1,154 | 70 | 268 | 72 | 44 | 190 |
| Type of treatment just prior to run | None | None | None | (¹) | None | Steaming | None | Steaming | (²) | None |

¹ Gas oil wash. ² Regeneration.

The run shown in Example V was continued to a total catalyst age of 4637 hours. The catalyst was unloaded and tested and was then regenerated in a similar manner to that used after 3747 hours of operation. The advantage of the regeneration procedure disclosed herein for minimizing loss of catalytic surface area is shown by the following data. The surface area of the used catalyst was only 43 m.²/gram, after carbon was removed in a muffle furnace at 1000° F. however, after removing carbon in the pilot unit reactor at 600–700° F., the surface area was 93 m.²/g. Thus, the surface area of the catalyst regenerated at lower temperatures was about twice the surface area obtained after regeneration at 1000° F. To further illustrate the disadvantage of regeneration at 1000° F., a sample of the catalyst regenerated at 600–700° F. was further heated in a muffle furnace at 1000° F. The surface area was reduced from 93 m.²/g. to 67 m.²/g., even though no additional carbon was removed during the 1000° F. treatment. Although carbon burn-off at 1000° F. is the most detrimental method for reducing catalytic surface area, heating an essentially carbon free catalyst containing contaminant metals also causes a loss of surface area. It is well known in the art that heating a fresh catalyst (containing no contaminant metals at 1000° F. does not cause a significant loss of surface area. In fact, fresh catalyst preparation procedures disclosed in the art usually include a drying step between 200–800 F., followed by a calcination step at around 1000° F.

As shown, the deactivation rate was very similar to that of the fresh catalyst. Thus, the regeneration procedure has the desirable effects of restoring activity to about that of fresh catalyst and providing an aging rate at least as good as that of the fresh catalyst.

In the examples given, it should be noted that catalyst regenerations were conducted in electrically wound reactors, with thermocouples spaced throughout the catalyst bed. The air to steam ratios used were those necessary to control the burn front within the desired limits. On commercial reactors, where temperatures are maintained with heaters ahead of the reactor, it is desirable to control the burn front by adjustment of the inlet temperature on the reactor and by control of the mole percent $O_2$ at the reactor inlet. It is preferred to initiate the burn at a reactor inlet temperature of 600° F., with the mole percent $O_2$ below about 0.5. The reactor inlet temperature and the mole percent oxygen can then be adjusted to control the burn front below the desired limits, but the inlet temperature should be maintained above 400° F., preferably above 500° F.

The hydrogen used in the practice of this invention can be derived from any available source such as electrolytic hydrogen, hydrogen obtained from the partial combustion of a hydrocarbonaceous material followed by shift conversion and purification or catalytic reformer by-product hydrogen and the like. The hydrogen should have a purity of between 50 and 100% although hydrogen purities of 75–90 volume percent are preferred. The hydrogen is introduced into the reactor at a rate between 1000 and 20,000 s.c.f.b., a preferred rate being 3000–10,000 s.c.f.b.

Where a nickel-containing catalyst has been used carbonyl formation by the reaction of CO with the nickel may be encountered. To prevent carbonyl formation during regeneration, the nitrogen atmosphere can be maintained in the reactor until the catalyst bed temperatures are at least 500° F. This temperature level is well above the decomposition temperature of nickel carbonyl; consequently, when air is added to the reactor and the burn initiated the temperature level prevents the reaction of any CO present with the nickel in the catalyst.

We claim:

1. A process for regenerating a bed of catalyst used in hydrodesulfurizing residual oils, with high carbon and metals contents, which catalyst includes a Group VIII metal compound present in an amount ranging from about 1 to about 20% by weight and a Group VI metal compound present in an amount ranging from about 5 to about 40% by weight, on an alumina-silica support containing 2%–30% silica, said catalyst having a surface area of 250 m.²/g. to 400 m.²/g., consisting essentially of the steps of sequentially contacting said bed with hydrogen, introduced at a rate of 3,000–10,000 s.c.f.b., and a distillate oil boiling in the range of 115–1100° F. and containing less than 1.0 wt. percent Conradson carbon residue at a pressure ranging from 0 to 3000 p.s.i.g. at a temperature of about 600° F. to about 800° F. and 0.1 to 20.0 weight of charge per hour per weight of catalyst; purging with hydrogen; cooling said catalyst then purging with an inert gas; steaming the bed at a temperature ranging from about 400° F. to 800° F. at 0 to 200 p.s.i.g. and about 0.01 to 20 lbs. of steam per hour per lb. of catalyst for a time ranging from about 1 to 48 hours; and air burning the steamed bed with an air-steam mixture at a maximum bed temperature below about 800° F. but sufficiently high to remove oil and carbonaceous deposits from said bed without sintering contaminant metals thereon or causing extensive loss of surface area therefrom.

2. The process according to claim 1 wherein said hydrogen and distillate oil is passed over said bed for about 1 to 20 hours.

3. The process according to claim 1 wherein said air burning is effected at a temperature of about 600° F. at the reactor inlet of said bed with a maximum burn front of below about 800° F.

4. The process according to claim 3 wherein the oxygen concentration at said reactor inlet is maintained at below about 1.0 mole percent.

5. The process according to claim 3 wherein the oxygen concentration at said reactor inlet is maintained below about 0.5 mole percent.

6. The process according to claim 3 wherein the catalyst bed temperature is raised to about 700° F. as the burn front progresses through said bed.

7. The process according to claim 1 wherein a depressurizing step is carried out between said purging with hydrogen and with nitrogen.

8. The process according to claim 1 wherein said catalyst contains nickel and a nitrogen atmosphere is maintained thereover until the catalyst bed temperature is at least 500° F., prior to said air burning so as to prevent carbonyl formation.

References Cited
UNITED STATES PATENTS

| | | | |
|---|---|---|---|
| 2,333,851 | 11/1943 | Egloff | 252—414X |
| 2,456,148 | 12/1948 | Read, Jr. | 252—414X |
| 2,457,556 | 12/1948 | Heinemann et al. | 252—414X |
| 2,813,835 | 11/1957 | Nozaki | 252—416X |
| 2,866,750 | 12/1958 | Mosesman | 252—414X |
| 3,076,755 | 2/1963 | Stark et al. | 208—216 |
| 3,158,563 | 11/1964 | Strecker | 252—414X |

DANIEL E. WYMAN, Primary Examiner

P. E. KONOPKA, Assistant Examiner

U.S. Cl. X. R.

208—216; 252—416, 419

PO-1050
(5/69)

UNITED STATES PATENT OFFICE
CERTIFICATE OF CORRECTION

Patent No. 3,565,820      Dated February 23, 1971

Inventor(s) WILLIAM R. COONS, JR., Gerald V. Nelson and Glen Wray

It is certified that error appears in the above-identified patent and that said Letters Patent are hereby corrected as shown below:

Column 2, line 19, "VII" should read --VIII--

Column 2, line 72, "dissolves" should read --dissolved--

Table V, Run 8, "2.54" should read --25.4--.

Column 6, line 52, "Table IV" should read --Table VI--

Column 6, line 72, "14.8" should read --14.6--.

Column 8, line 57, "1.4" should read --1.04--.

Column 6, line 66, "stem" should read --steam--.

Signed and sealed this 9th day of November 1971.

(SEAL)
Attest:

EDWARD M. FLETCHER, JR.      ROBERT GOTTSCHALK
Attesting Officer      Acting Commissioner of Patents